Nov. 8, 1927.

Re. 16,782

C. D. FARMER ET AL

ROAD BUILDING MACHINERY

Original Filed Aug. 26, 1920 3 Sheets-Sheet 1

Inventor
Cornelius D. Farmer,
Hollis W. Libby,
by Geisler & Ramsey
Attorneys

Nov. 8, 1927. Re. 16,782

C. D. FARMER ET AL.

ROAD BUILDING MACHINERY

Original Filed Aug. 26, 1920 3 Sheets-Sheet 2

Inventor
Cornelius D Farmer,
Hollis W. Libby,
by Geisler & Ramsey
Attorneys

Nov. 8, 1927. Re. 16,782

C. D. FARMER ET AL

ROAD BUILDING MACHINERY

Original Filed Aug. 26, 1920 3 Sheets-Sheet 3

Inventor
Cornelius D. Farmer,
Hollis W. Libby
by Geisler & Ramsey
Attorneys

Reissued Nov. 8, 1927. Re. 16,782

UNITED STATES PATENT OFFICE.

CORNELIUS D. FARMER AND HOLLIS W. LIBBY, OF EUGENE, OREGON, ASSIGNORS OF ONE-HALF TO C. EMIL FORCE AND ONE-HALF TO E. J. CURRIGAN, BOTH OF PORTLAND, OREGON.

ROAD-BUILDING MACHINERY.

Original No. 1,439,879, dated December 26, 1922, Serial No. 406,071, filed August 26, 1920. Application for reissue filed December 26, 1924. Serial No. 758,273.

The present invention relates in general to road building methods and machinery, and more particularly to an improved machine especially adapted to carry out resurfacing operations.

The object of our invention is to provide a machine by which the roadway may be provided with a new surface completely covering the old roadway and filling all ruts, breaks and bad places so as to present a smooth and even surface well adapted to bear the strains incident to traffic, and in which the resurfacing of the roadway is carried out expeditiously and with a minimum of handling of the resurfacing material and a minimum expenditure of labor.

Another and principal object of our invention is to provide a machine of the character described with a vertically disposed scraper plate, or blade-like member or surface arranged transversely between the sides of the machine, and adapted to bear on and scrape the surface of the road over which the machine is moved; and to provide such blade with means for heating it, so as to keep in a liquid state the surfacing material piling up in front of the blade as the machine is moved forward.

Furthermore we preferably arrange said blade at an oblique angle in a horizontal plane with the sides of the machine that in the forward travel of the machine one end of the blade will move relatively in advance of the other and thus to neutralize any tendency of the liquid surfacing material from piling up in front of the blade, but instead causing the blade to move said material sidewise across the road and thus spread the material laterally over the road surface. In this way the forward movement of the machine causes the surfacing material to be evenly distributed over the road surface and to fill in the ruts and hollows thereof until a smooth surface is secured.

Furthermore we tilt the said blade towards the rear of the machine, thereby to cause the blade to tend to lift and hold up the surfacing material, thus facilitating its spreading over the road surface and neutralizing any tendency of the blade climbing over said material.

A still further object of our invention is to make the said blade adjustable so as to be able to vary the pressure thereof on the road surface or the surfacing material as desired.

Other objects and advantages reside in the certain novel features of the construction, arrangement and combination of parts of the apparatus and of the nature, relation and sequence of the steps of the method which will be hereinafter more fully described and particularly pointed out in the appended claims, reference being had to the accompanying drawings forming part of this specification, and in which—

Figure 1:
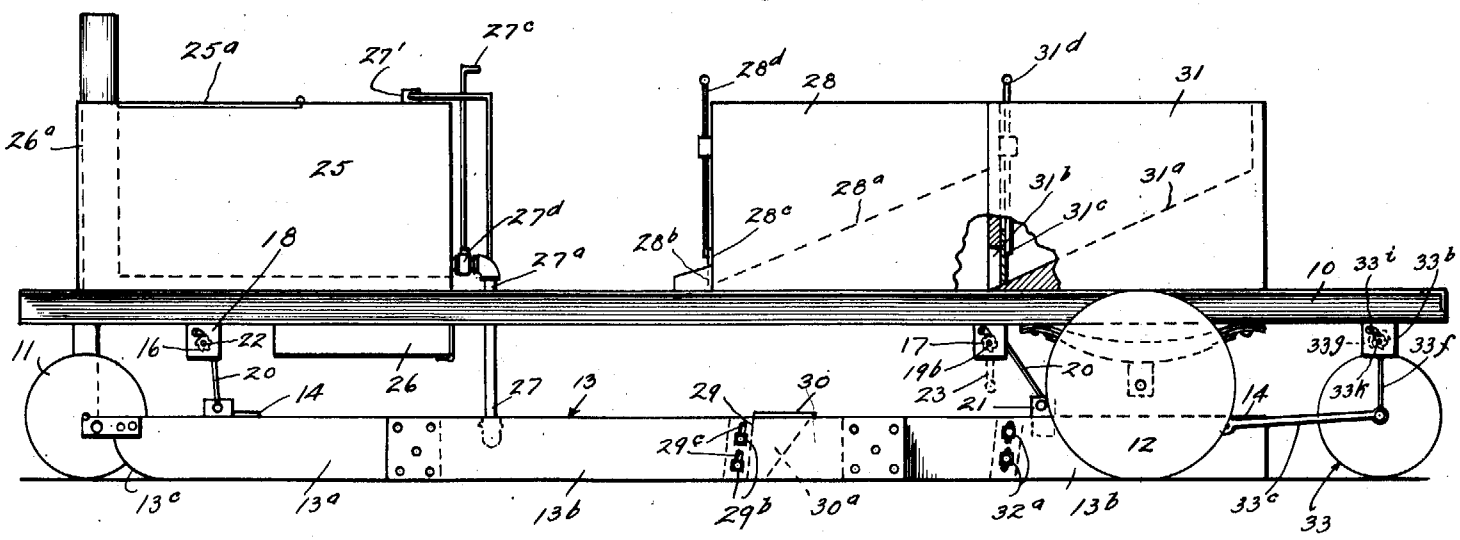
Figure 1 is a side elevational view of the apparatus.
Figure 2:
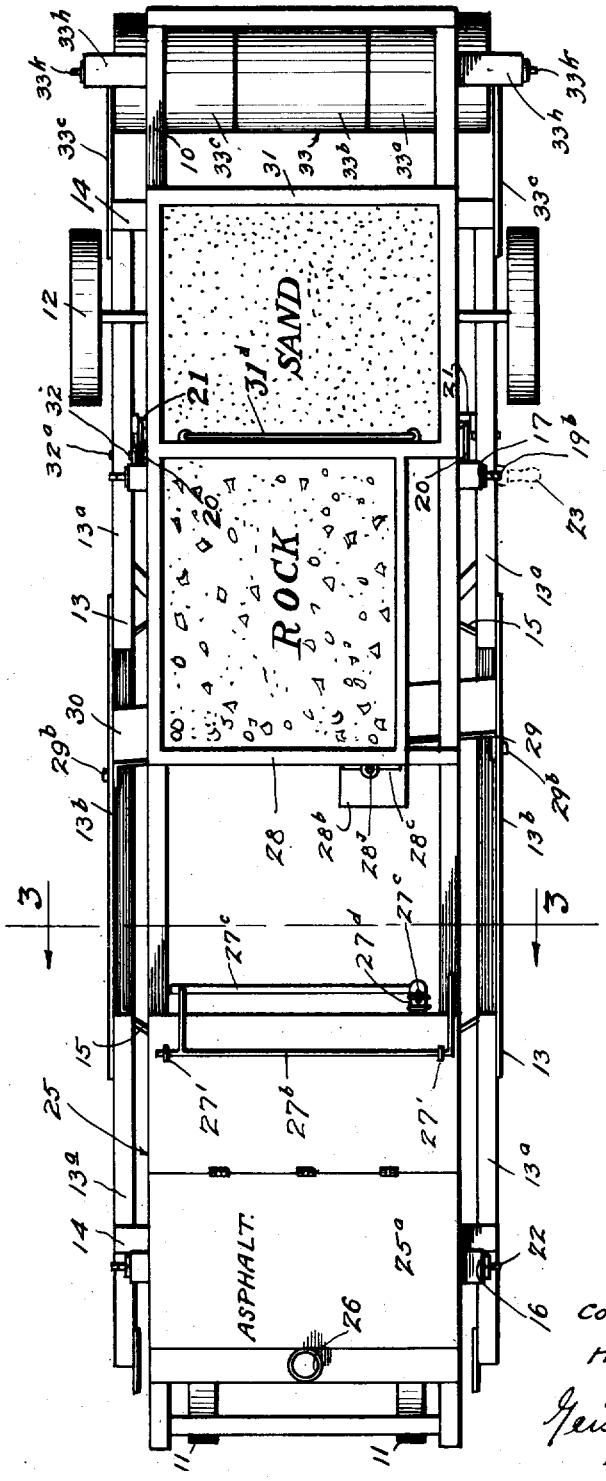
Figure 2 is a plan view thereof.

Referring to the drawings, it will be seen that the apparatus embodying the invention includes a wheeled vehicle having a suitable frame 10, front wheels 11 and rear wheels 12. The vehicle is adapted to be drawn over the road to be resurfaced in any suitable manner and by any suitable means.

A sled is arranged beneath the vehicle and consists of side bars 13, and bars 14 and suitable cross braces 15 extending between the side bars. The side bars 13 are of composite construction, having front and rear wooden members $13^a$ and intermediate steel members $13^b$. The front ends of the side bars 13 are curved upwardly as at $13^c$ in Figure 1, to facilitate the travel of the sled over obstruction and irregularities in the roadway. On the under side or road engaging surface each of the wooden members $13^a$ is provided with metallic shoes $13^d$.

Figures 3, 4:
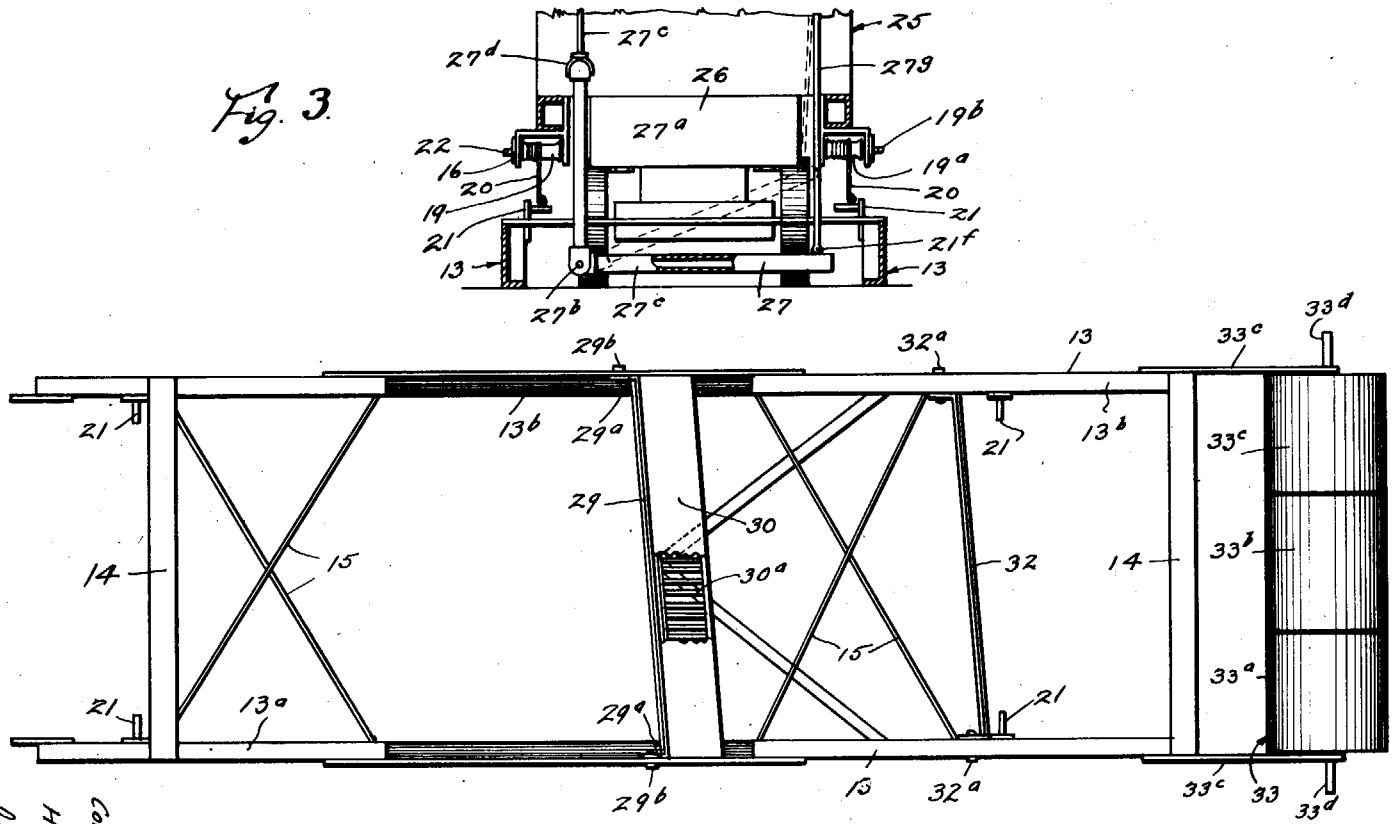
Figure 3 is a transverse sectional view on the line 3—3 of Figure 2.
Figure 4 is a plan view of the sled apart from the wheeled vehicle, parts being broken away for the sake of illustration.

The sled is adapted to be drawn by the vehicle when in use, and when not in use it may be suspended from the vehicle out of engagement with the roadway. The means for suspending the sled from the vehicle and drawing the same therefrom consists of a pair of windlasses 16 carried at the forward end of the vehicle and a pair of windlasses 17 carried at the rear end of the vehicle. Each windlass of each pair is identical in construction and as shown in Figure 3 includes the frame or bracket 18 secured to the side members of the frame 10 of the vehicle, and a winding drum 19 which has its axle $19^a$ journaled in the bracket 18, and upon the winding drum a cable 20 is secured and is adapted to be coiled. The free end of the cable 20 is secured, as at 21, to the adjacent side member 13 of the sled. Pawl and ratchet mechanism 22 co-operates with the axle $19^a$ of the winding drum, and the bracket 18, to normally prevent unwinding of the cable from the windlass. The outer end of the axle $19^a$ is squared, as indicated at $19^b$, to receive a suitable operating member, such as the crank handle 23 shown in dotted lines in Figure 1. It is obvious that as the cables 20 are wound upon the winding drums the sled is at first drawn closer to the vehicle and finally is lifted off the ground to be suspended entirely from and carried entirely by the vehicle.

An asphalt tank or kettle 25 is carried at the front or forward end of the vehicle body, resting upon the forward portion of the vehicle frame 10. The tank 25 is adapted to contain heated asphalt or the like, and for this purpose is provided at its top with a swinging door $25^a$ to provide for the dumping or delivery of the asphalt to the tank.

Heating means for the asphalt tank is provided and is carried upon the vehicle. This heating means may be of any standard construction, and preferably includes a firebox 26 and a flue $26^a$.

A distributor 27 is associated with the asphalt tank and includes (see Figure 3) a delivery or outlet pipe $27^a$ having swiveled at its lower end, as at $27^b$, a transversely extending perforated distributor pipe $27^c$. The heated asphalt thus flows through the delivery pipe $27^a$ into the distributor pipe and is discharged in a plurality of jets from the distributor pipe across and upon the surface of the road. Controlling means for regulating the flow of the asphalt through the distributor is provided and consists of a valve $27^d$ arranged in the delivery pipe $27^a$ and operated by a handle lever or the like $27^e$. The free end of the distributor pipe $27^c$ is pivotally connected, as at $27^f$, to the arm $27^g$ of an operating lever $27^h$ which is rotatably mounted, as at $27^i$, upon the top of the asphalt tank and which is adapted to raise or lower the free end of the distributor pipe so as to vary its inclination with respect to the road and thus vary the feed of the asphalt to various parts of the road.

A hopper 28 for heated rock, crushed stone, gravel or the like is carried by the frame of the vehicle to the rear of the asphalt tank. The hopper 28 is provided with an inclined bottom $28^a$, which leads to a laterally extending discharge opening $28^b$ having an adjustable valve or gate $28^c$ controlled by operating means $28^d$. The heated rock, gravel, crushed stone or the like is thus spread across the surface of the road when discharged from the opening $28^b$. Suitable means (not shown) is provided for heating the rock hopper and may be of any standard or conventional construction. It is thus seen that as the asphalt is applied to the surface of the road, or immediately after, the heated rock is applied to the asphalt coated road and, due to the molten or plastic condition of the asphalt and to its own heat, the rock sinks into the asphalt.

Means are provided for subjecting the rock and asphalt on the road to the simultaneous action of heat and pressure. These means consist of a heat and pressure plate 29 extending transversely between the side members 13 of the sled and having its ends bent at right angles, as indicated at $29^a$, and secured by fastening means $29^b$ to the steel members $13^b$ of the sled. It is to be noted from Figures 1 and 4 especially the former that the upper edge of the said heat-and-pressure plate, or blade, 29, is slightly tilted back, that is to the rear of the machine. The advantage of such construction is as mentioned, it adapts the blade to lift and hold up the surfacing material and in so doing facilitates the spreading of the material over the road surface; also tends to neutralize any tendency of the blade climbing over the material. The fastening members $29^b$ preferably operate in elongated slots $29^c$ so that the heat and pressure plate 29 is adjustable. The purpose of this construction is to permit the adjustment of the blade so as to vary the pressure with which its scraping or lower edge bears on the road surface and the material applied on the latter; it also permits the adjustment of the blade in such a way as to tilt slightly at an end and thus to bear more on one side of the road than the other, if desired in order to fill in the ruts of, or smooth over, the road surface. The plate 29 is heated by any suitable means, which preferably includes a combustion chamber 30 having grate bars $30^a$. The heating means is also carried by the steel members $13^b$ of the sled. The heat and pressure plate 29 exerts a smoothing and scraping action upon the road to regulate the thickness of the surfacing material and to compact the proper thickness of material while subjecting this material to the action of the heat to the end of more intimately associating the ingredients thereof. For this purpose the plate 29 is maintained more highly heated asphalt.

A sand hopper 31 is carried by the rear of the frame 10 of the vehicle, preferably immediately behind the rock hopper 28. The sand hopper 31 is also provided with an inclined bottom $31^a$ and a laterally and horizontally extending discharge opening $31^b$ at the forward and lower end of the hopper. A control valve or gate $31^c$ is mounted for sliding movement across the discharge opening and is provided with a suitable operating or controlling means $31^b$ by which it may be adjusted to vary the discharge from the sand hopper. The sand from the hopper is thus spread upon the roadway immediately after the asphalt and rock have been applied and treated by the heat and pressure plate 29. A scraper and pressure plate 32 is adjustably secured, as at $32^a$, to the side members $13^a$ of the frame of the sled. The adjustment of the scraper and pressure plate 32 is preferably somewhat higher than the adjustment of the heat and pressure plate 29 in order to allow a coating of sand to remain upon the roadway on top of the asphalt and rock. It is to be understood that the scraper and pressure plate 32 spreads and compacts the sand upon the road and regulates its thickness.

At the rear of the apparatus a roller 33 is provided, and preferably consists of three sections $33^a$ and $33^b$ and $33^c$, respectively, mounted upon a common shaft $33^d$. The ends of the shaft $33^d$ are connected by drag bars $33^e$ to the sled. The ends are also connected to the cables $33^f$ which are wound upon winding drums $33^g$ carried by brackets $33^h$ secured to the frame 10 of the vehicle. These winding drums are identical in construction with the winding drums 19 shown in Figure 3 and have the same character of pawl and ratchet mechanism $33^i$ and operating mechanism $33^k$ associated therewith.

In operation, when it is desired to use the invention for resurfacing a roadway, the sled is lowered into contact for engagement with the ground and the heat and pressure plate 29 and the scraper and pressure plate 33 are adjusted corresponding to the thickness of the surfacing which it is desired to apply. The machine is then drawn over the roadway by any suitable means. The flow of the heated asphalt through the distributor 27 is regulated by the operator in accordance with the conditions as the control mechanism of the distributor is flexible and highly responsive. The asphalt is evenly spread over the old surface of the roadway and completely covering the same and filling all ruts, breaks and bad places. The heated rock then forms uniformly on the applied asphalt and due to the molten condition of the asphalt and to its own heat this rock sinks into and is intimately associated with the asphalt on the roadway so that it is mixed therewith on the roadway. This mixture of the rock and asphalt is further enhanced by the action of the heat and pressure plate 29. By the action of the heat and pressure to which the rock and asphalt are subjected the rock is firmly embedded in the asphalt and is evenly distributed therethrough, and the entire mass is compacted and the surface thereof is smooth and rendered uniform throughout.

Immediately subsequent to this, a coating of sand is spread over the asphalt while it is still in its heated condition and this coating of sand is then subjected to the action of the scraper and pressure plate 32, which presses the sand into binding contact with the asphalt and which makes the sand coating of uniform thickness over the entire surface. The complete resurfacing is then subjected to the rolling action of the roller 33, which finally compacts the complete mass.

It will be understood that the invention involves a method of resurfacing which consists in the first instance of uniformly distributing highly heated asphalt on the old surface of the roadway, then uniformly distributing heated rock on the applied asphalt so that the heated rock and the heated asphalt are mixed upon the roadway. The heated rock and asphalt are then simultaneously subjected to the action of heat and pressure, which causes the rock and asphalt to enter into more intimate mixture, which compacts the rock and asphalt and smooths the surfaces thereof, so that it is uniform and continuous throughout.

While still in the heated condition sand is uniformly distributed on the rock and asphalt and the sand is then subjected to the action of a scraping and smoothing pressure, which provides for even and uniform coating of sand and an intimate association of the sand with the asphalt so that the sand and asphalt enter into combined engagement. The entire mass is then subjected to a rolling action.

We claim:

1. In an apparatus of the character described, a wheeled vehicle, a sled arranged beneath and drawn by the vehicle, an asphalt tank carried at the forward end of the vehicle, means for heating the asphalt tank, a distributor for spreading the asphalt on the roadway, a heated hopper for containing rock arranged on the vehicle behind the asphalt tank and having a discharge opening for feeding the heated rock to the asphalt coated roadway, means for subjecting the rock and asphalt on the roadway, means for subjecting the rock and asphalt on the roadway to heat and pressure including a scraper and pressure plate carried by the sled and heating means for said plate, a sand hopper carried at the rear end of the vehicle and having a discharge opening for feeding the sand to the surfacing of asphalt and rock, a scraper and pressure plate for the sand carried by the sled, and a roller carried by the rear end of the sled.

2. In an apparatus of the character described, a wheeled vehicle, a sled arranged beneath and drawn by the vehicle, an asphalt tank carried at the forward end of the vehicle, means for heating the asphalt tank, a distributor for spreading the asphalt on the roadway, a heated hopper for containing rock arranged on the vehicle behind the asphalt tank and having a discharge opening for feeding the heated rock to the asphalt coated roadway, means for subjecting the rock and asphalt on the roadway to heat and pressure including a scraper and pressure plate carried by the sled and heating means for said plate, and a sand hopper carried at the rear end of the vehicle and having a discharge opening for feeding the sand to the surfacing of asphalt and rock, and a scraper and pressure plate for the sand carried by the sled.

3. In an apparatus of the character described, a wheeled vehicle, a sled arranged beneath and drawn by the vehicle, an asphalt tank carried at the forward end of the vehicle, means for heating the asphalt tank, a distributor for spreading the asphalt on the roadway, a heated hopper for containing rock arranged on the vehicle behind the asphalt tank and having a discharge opening for feeding the heated rock to the asphalt coated roadway, means for subjecting the rock and asphalt on the roadway to heat and pressure, including a scraper and pressure plate carried by the sled, and heating means for said plate.

4. In an apparatus of the character described, a wheeled vehicle, means carried by the vehicle for containing and feeding surfacing material, a sled arranged beneath and drawn by the vehicle, and means carried by the sled for subjecting the material upon the surface of the road to the action of heat and pressure.

5. In an apparatus of the character described, a tank for containing heated asphalt, a distributor for spreading the heated asphalt from said tank upon the roadway, a hopper for heated rock having a discharge opening adapted to feed the heated rock to the asphalt coated roadway, and means for subjecting the rock and asphalt to the action of heat and pressure.

6. In an apparatus of the character described, a wheeled vehicle, means carried by the vehicle for containing and feeding surfacing material, a sled arranged beneath and drawn by the vehicle, means for suspending the sled from the vehicle, including a pawl and ratchet controlled winding drum, and a cable coiled upon the drum and connected to the sled, and means for subjecting the material upon the surface of the road to the action of heat and pressure.

7. In an apparatus of the character described, a wheeled vehicle, means carried by the vehicle for containing and feeding the surfacing material, a sled arranged beneath and drawn by the vehicle, and means carried by the sled for subjecting the material upon the surface of the road to the action of heat and pressure, including an adjustable plate.

8. In an apparatus of the character described, a wheeled vehicle, means carried by the vehicle for containing and feeding the surfacing material, a sled arranged beneath and drawn by the vehicle and including a frame having side members consisting of front and rear wooden sections and intermediate steel sections, and means for subjecting the material upon the surface of the road to the action of heat and pressure, including a pressure plate adjustably mounted upon the steel sections of the side members of the sled, and heating means for said plate carried by said steel sections.

9. In an apparatus of the character described, a tank for containing heated asphalt, a distributor for spreading the heated asphalt from said tank upon the roadway, a hopper for heated rock having a discharge opening adapted to feed the heated rock to the asphalt coated roadway, means co-operating with the discharge opening of said rock hopper for varying the feed of the heated rock, a sand hopper for feeding sand to the surface of the asphalt and rock upon the roadway, and means for varying the feed of said sand.

10. In an apparatus of the character described, a wheeled vehicle, means carried by the vehicle for containing and feeding surface material, a supplementary carrier-element carried beneath the vehicle, and a scraper-bar carried by said supplementary carrier-element, said scraper-bar being vertically adjustable, and being provided with means carried by the scraper-blade for holding combustible material, whereby to heat the latter.

CORNELIUS D. FARMER.
HOLLIS W. LIBBY.